US008925387B2

(12) United States Patent
Paul et al.

(10) Patent No.: US 8,925,387 B2
(45) Date of Patent: Jan. 6, 2015

(54) TRAVERSING TIME OF ARRIVAL PROBE

(71) Applicant: United Technologies Corporation, Hartford, CT (US)

(72) Inventors: John E. Paul, Portland, CT (US); Robert Kujawa, Stuart, FL (US); Darren M. Wind, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 174 days.

(21) Appl. No.: 13/719,575

(22) Filed: Dec. 19, 2012

(65) Prior Publication Data

US 2014/0165736 A1 Jun. 19, 2014

(51) Int. Cl.
*G01L 1/00* (2006.01)
*G01L 1/24* (2006.01)

(52) U.S. Cl.
CPC ........................................ *G01L 1/24* (2013.01)
USPC ............................................................ 73/760

(58) Field of Classification Search
USPC ........................................................... 73/760
See application file for complete search history.

(56) References Cited

U.S. PATENT DOCUMENTS

| | | | | |
|---|---|---|---|---|
| 3,762,791 A | * | 10/1973 | Fournier et al. | 359/201.1 |
| 5,201,227 A | * | 4/1993 | Iinuma et al. | 73/655 |
| 5,761,956 A | * | 6/1998 | Beeson et al. | 73/660 |
| 7,239,436 B2 | * | 7/2007 | Oettinger et al. | 359/213.1 |
| 8,151,647 B2 | * | 4/2012 | Twerdochlib | 73/661 |
| 8,256,297 B2 | * | 9/2012 | Sue et al. | 73/643 |
| 2008/0101930 A1 | | 5/2008 | Bosche et al. | |
| 2010/0018321 A1 | | 1/2010 | Nicklous et al. | |
| 2013/0304418 A1 | * | 11/2013 | Gendrich | 702/182 |

FOREIGN PATENT DOCUMENTS

| | | |
|---|---|---|
| JP | 2000-206100 A | 7/2000 |
| JP | 2003-098134 A | 4/2003 |
| KR | 10-2007-0013007 A | 1/2007 |

OTHER PUBLICATIONS

International Search Report and Written Opinion for related International Application No. PCT/US2013/069656; report dated Nov. 12, 2013.

* cited by examiner

*Primary Examiner* — Lisa Caputo
*Assistant Examiner* — Octavia Hollington
(74) *Attorney, Agent, or Firm* — Miller, Matthias & Hull LLP (57) ABSTRACT

A system and method for performing stress measurement on rotating parts is disclosed. The system may include a laser assembly configured to emit a laser beam, and a probe assembly mounted proximal to a rotatable part in a device. The probe assembly may be configured to output a reflected laser beam onto a first target on the rotatable part. The probe assembly may further be configured to move the reflected laser beam from the first target to a second target on the rotatable part. The probe assembly may include a redirector moveable from a first position to a second position, and a lens mounted proximal to the redirector and configured to focus the laser beam. The redirector may be configured to change the laser beam direction from a first direction to a second direction when moved from the first position to the second position.

20 Claims, 6 Drawing Sheets

TRAVERSING TIME OF ARRIVAL PROBE

TECHNICAL FIELD OF THE DISCLOSURE

The present disclosure relates to stress measurement of rotating parts and, more particularly, relates to stress measurement used with inspection of rotating members captured by probes.

BACKGROUND OF THE DISCLOSURE

Laser time of arrival probes have been used in industry to measure vibratory deflections of rotating parts to support design validation. The probes are a nonintrusive option that may be used instead of traditional rotating strain gauges. While such probes have been shown to be helpful to the determination of low order/frequency fundamental vibratory modes where expected deflections are relatively large, the use of these probes has been significantly less beneficial to the measurement and determination of high order/frequency modes of vibration typically associated with very low deflection to stress ratios, and therefore very low expected deflections resulting in low signal to noise ratios.

In contrast to measuring low order/frequency modes, successfully measuring high order/frequency modes requires a large number of probes located at different circumferential locations proximal to the rotating part. Such probes should be located in regions where maximum modal deflections occur. If the selected measurement location on the part is not at a local maximum, the measured deflection may be hidden within the noise and the measurement becomes unusable.

High order/frequency modes may also be sensitive to manufacturing variations which cause the location of maximum vibratory deflection to vary from part to part, for example, blade to blade variation within a rotor stage. A blade is an example of a part/subcomponent where a set of such parts/subcomponents when assembled or integrally manufactured as a rotor make up a larger component referred to as a rotor stage. Thus, it may be difficult to select a single repeatable measurement location for all blades within a rotor stage. If the location of the maximum local deflection is not consistent on each blade, it may be very difficult to determine the stress from a measured deflection of the part/subcomponent. To solve these problems a very large and impractical number of probes may be required to increase the probability of measuring the local maximum deflection.

Furthermore, when more than one mode of vibration is being measured often there is a requirement for the probes to be located proximal to multiple locations on the part. In addition, high order/frequency modes may be closely spaced in the frequency domain, and therefore, it may be difficult to correctly identify the mode of vibration, especially when frequency mistuning causes closely spaced modes to simultaneously occur. If the mode is incorrectly identified, the stress to deflection ratios used to estimate stress may not be useful.

SUMMARY OF THE DISCLOSURE

In accordance with one aspect of the present disclosure, a traversing time of arrival probe system for stress measurement of rotatable parts is disclosed. The system may comprise a laser assembly configured to emit a laser beam, and a probe assembly mounted proximal to a rotatable part in an engine. The probe assembly may be configured to output a reflected laser beam onto a first target on the rotatable part. The probe assembly may further be configured to move the reflected laser beam from the first target to a second target on the rotatable part. The probe assembly may include a redirector moveable from a first position to a second position, and a lens mounted proximal to the redirector and configured to focus the laser beam. The redirector may be configured to change the laser beam direction from a first direction to a second direction when moved from the first position to the second position.

In an embodiment, the system may further comprise a detector configured to receive and to measure reflected incident light from the rotatable part, wherein reflection of the reflected laser beam off of the rotatable part is a primary source of the reflected incident light.

In a refinement, the rotatable part may be a blade. In a further refinement, the first target and the second target may be disposed in a target range on the span of the blade. In one embodiment, the length of the target range may be less than about 50 percent of the span of the blade and the target range may be substantially disposed in the upper half of the blade. In another embodiment, the first target and the second target may be each disposed on the chord of the blade.

In another embodiment of the system, the probe assembly may further include a turning tool operably connected to the redirector and configured to move the redirector from the first position to the second position. In a refinement, the system may further comprise a controller operably connected to the turning tool. The controller may be configured to remotely control the turning tool to move the redirector from a first position to a second position, wherein the turning tool may be a servo motor.

In another refinement, the redirector may be a moveable mirror. In a further refinement, the lens may be configured to focus the laser beam on the moveable mirror. In another refinement, the probe assembly may further include a fixed mirror, wherein the lens may be configured to focus the laser beam on the fixed mirror and the fixed mirror may be oriented to reflect the laser beam onto the moveable minor.

In another embodiment of the system, the probe assembly may further include a fixed minor, wherein the redirector may be a portion of an emission optic channel oriented to emit the laser beam onto the lens, and the lens may be configured to focus the laser beam onto the fixed minor. In a refinement, the probe assembly may further include a motor operably connected to the emission optic channel and configured to move the emission optic channel from the first position to the second position. In another refinement, the fixed minor may be a convex minor. In another refinement, the fixed mirror may be a multi-faceted minor.

In another embodiment, the probe assembly may further include a plurality of fixed mirrors, wherein the redirector may be an emission optic channel oriented to emit the laser beam onto the lens, and the lens may be configured to focus the laser beam onto one of the plurality of fixed minors.

In accordance with another aspect of the present disclosure, a method for performing stress measurement on rotating blades is disclosed. The method may comprise selecting a first position of a redirector disposed within a probe assembly located proximal to a rotating blade in an engine, performing an rpm sweep, determining maximum deflection for the first position of the redirector, moving the redirector to a plurality of positions other than the first position while the engine is running, determining maximum deflection of the rotating blade at any of the plurality of positions, and converting the maximum deflection of the rotating blade to a stress measurement for the rotating blade. In an embodiment, the moving step may further include repeating the rpm sweep.

In accordance with yet another aspect of the present disclosure, a traversing time of arrival probe system for stress measurement is disclosed. The system may comprise a laser assembly configured to emit a laser beam, and a probe assembly mounted proximal to a rotating blade in an aircraft engine. The probe assembly may be configured to output a reflected laser beam onto a first target on the rotating blade. The probe assembly may be further configured to move the reflected laser beam from the first target to a second target on the rotating blade. The probe assembly may include a lens configured to receive and focus the laser beam, and a first mirror moveable between a first and second position. The mirror may be configured to change the laser beam direction from a first direction to a second direction when the mirror is moved from the first position to the second position.

In an embodiment, the lens may be configured to focus the laser beam onto the mirror, and the mirror may be configured to reflect the laser beam onto the first target on the rotating blade.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
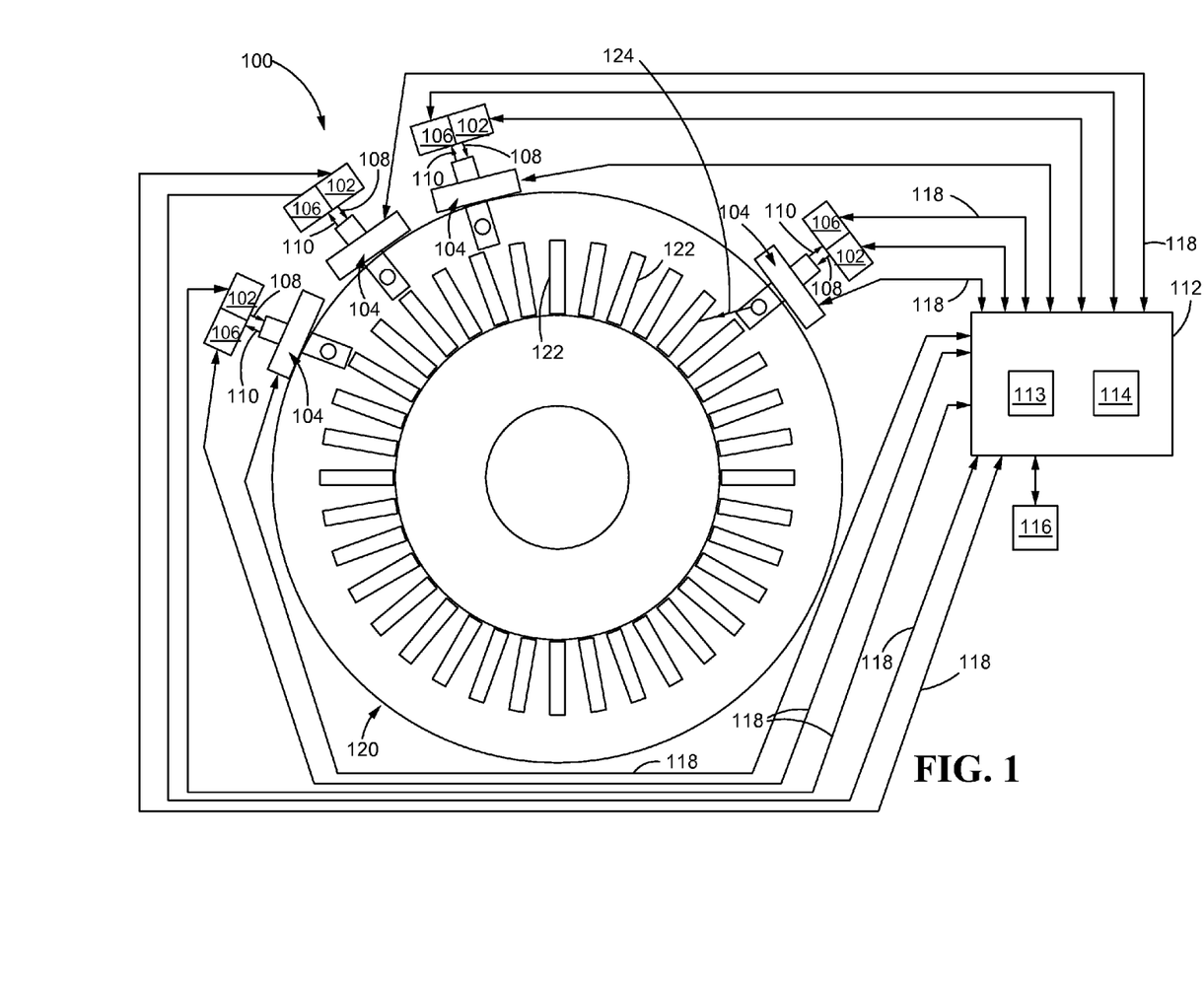
FIG. 1 is a schematic illustration of an embodiment of a stress measurement system.

Referring to FIG. 1, a schematic illustration of one embodiment of a traversing time of arrival probe system 100 is shown. In one embodiment, the system may comprise one or more laser assemblies 102, one or more time of arrival probe assemblies 104, one or more detectors 106, one or more emission optic channels 108 and one or more return optic channels 110. The system 100 may further include a controller 112. In some embodiments, the system may include a user interface 116. The system may further include communication channels 118 that connect each probe assembly 104 to the controller 112. Communication channels 118 may also connect the laser assembly 102, and the detector 106 to the controller 112.

Each laser assembly 102 is configured to emit a laser beam. Each laser assembly 102 is paired with a probe assembly 104. An emission optic channel 108, which carries or transmits the emitted laser beam, extends between the laser assembly 102 and the probe assembly 104.

Each probe assembly 104 may be mounted proximal to a rotatable part 122 and is configured to receive a laser beam emitted from a laser assembly 102. In the exemplary embodiment illustrated in FIG. 1, each probe assembly 104 is mounted in an engine 120 proximal to rotating blades 122. The probe assembly 104 is configured to output a laser beam that has undergone at least one reflection in the probe assembly 104 (a "reflected laser beam" 124 (see FIGS. 2-5)) onto a first target 126 (position) on the rotatable part 122 (in this case, a blade). The probe assembly 104 is further configured to move the reflected laser beam 124 from the first target 126 to a second target 128 (position) on the rotatable part 122. In an embodiment, the probe assembly may include a casing 132, a redirector 134, a first lens 136 mounted within the casing 132, and a turning tool 138. In another embodiment, the probe assembly may further include a fixed mirror 142.

The engine 120 (FIG. 1) may have a plurality of stages, each stage having a plurality of blades 122, which may require inspection or stress measurement. The engine 120 may be representative of a wide variety of engines, such as, aircraft engines, aeroderivative industrial gas turbines, steam turbines, diesel engines, automotive and truck engines, and the like. Notwithstanding the fact that the present disclosure has been described in relation to inspection and stress measurement of the blades 122 of an engine 120, in other embodiments, the system 100 may be employed to inspect and measure stress on other appropriate rotating parts/subcomponents of other types of equipment and devices. Such rotatable parts 122 are not limited to blades.

The casing 132 (see FIGS. 2-5) of the probe assembly defines a window 140 through which the reflected laser beam 124 exits the probe assembly 104. The casing 132 may enclose all or a portion of the probe assembly 104 elements.

The redirector 134 is configured to change the direction of a laser beam within the casing 132 from a first direction to a second direction when the redirector 134 is moved from a first position 135 to a second position 137.

The first lens 136 is configured to focus the laser beam that is emitted from the laser assembly 102. In some embodiments, the first lens 136 may also be configured to focus the incident light reflected off of a rotatable/rotating part 122 as it travels through the first lens 136 to the detector 106.

The turning tool 138 is configured to move the redirector 134 from a first position 135 to a second position 137. The turning tool 138 may be for example, a servo motor, pneumatics, hydraulics, or the like. In an embodiment, the turning tool 138 may be controlled remotely by the controller 112 (FIG. 1).

Each detector 106 (FIGS. 2-5) is paired with a probe assembly 104. The detector 106 may be configured to measure incident light reflected off of a rotatable/rotating part 122 ("reflected incident light" 130). A return optic channel 110 extends between each probe assembly 104 and each detector 106. The return optic channel 110 carries/transmits from the probe assembly 104 the beam of reflected incident light 130 generated from the reflection off of the rotatable/rotating part 122 of a reflected laser beam 124. Such reflected incident light 130 may enter the probe assembly 104 through window 140. The reflected incident light 130 may journey through the probe assembly 104 to the return optic channel 110 along a generally similar path as that taken by the laser beam entering the probe assembly from the laser assembly 102 and exiting the window 140 of the probe assembly 104 onto the rotatable part 122. In some embodiments, the path of the reflected incident light 130 through the probe assembly 104 may include travel through the first lens 136. In other embodiments, the path may include travel through a second lens (not shown) instead of the first lens 136. Data related to the reflected incident light 130 may be transmitted from the detector 106 to the controller 112. The optic channels 108, 110 may be any appropriate optic channels known in the art. For example, in one embodiment, the optic channels 108, 110 may be fiber optic channels, or the like.

The controller 112 may include a processor 113 and a memory component 114. The controller 112 may be operably connected to the probe assembly 104. The controller 112 may also be operably connected to the laser assembly 102, and the detector 106. In some embodiments, the controller 112 may also be operatively connected to the engine 120. In embodiments that include a user interface 116, the controller 112 may be operably connected to the user interface 116 as well. The processor 113 may be a microprocessor or other processor as known in the art or a processing circuit. The processor 113 may execute instructions and generate control signals for controlling the functionality of the probe assembly 104, including control of the turning tool 138 for moving the redirector 134 from a first position 135 to a second position 137, determining the measured deflection at a target 126, 128 on a rotating part 122, determining the resonant speeds at a target 126, 128 on a rotating part 122, moving the redirector 134 (thru the turning tool 138) to traverse a plurality of position, plotting the deflection measured, determining the maximum deflection and converting the maximum deflection to measured stress. Such instructions may be read into or incorporated into a computer readable medium, such as the memory component 114 or provided external to the processor 113. In alternative embodiments, hard wired circuitry may be used in place of, or in combination with, software instructions to implement a control method.

The term "computer readable medium" as used herein refers to any medium or combination of media that participates in providing instructions to the processor 113 for execution. Such a medium may comprise all computer readable media. Common forms of computer-readable media include, for example, a floppy disk, a flexible disk, hard disk, magnetic tape, or any other magnetic medium, a CD-ROM, any other optical medium, or any other medium from which a computer processor 113 can read.

The controller 112 is not limited to one processor 113 and memory component 114. The controller 112 may be several processors 113 and memory components 114.

In embodiment, the controller 112 may transmit control signals to the probe assembly (including the turning tool), the laser assembly, and the detector, and the controller 112 may receive data from such elements of the system 100. This data may be used by the controller 108 to assist with the control of the system 100 and the measurement of stress on the rotating part 122

The user interface 116 may comprise a visual display. The user interface 116 may also include keyboard, touch screen or any other input device as known in the art. The communication channels 118 may be optical channels or alternatively, may be any other wired, wireless or radio channels or any other type of channels capable of transmitting information between two points including links involving the World Wide Web (www) or the internet.

Figure 2:
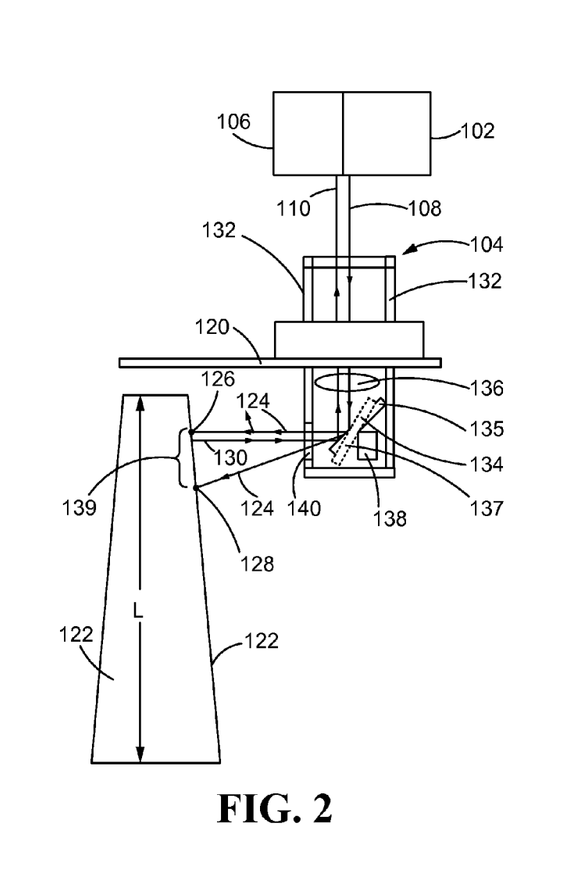
FIG. 2 is a schematic illustration of an embodiment of a probe assembly mounted on a wall of an engine.

FIG. 2 illustrates one embodiment of a probe assembly 104 mounted on a wall of an engine 120. For clarity, one blade 122 of the engine 120 is shown in relation to the probe assembly 104. It being understood that the blade 122 is one of many rotating blades 122 in the engine 120. In the embodiment of FIG. 2, the probe assembly 104 is configured to move the reflected laser beam 124 (output from the probe assembly 104) from the first target 126 to a second target 128 on the rotatable part 122. In this particular embodiment, both the first target and the second target (and any further targets) are disposed on the span of the rotatable part 122. The term "span" referring to the length L of the major dimension of the rotatable part. The first and second targets 126, 128 (positions) may be disposed on the face, the back side, or an edge of the rotatable part 122. Thus, in one embodiment, the first and the second targets 126, 128 may be disposed on the face of the rotatable part at different positions along its span L. Alternatively, the first and second targets 126, 128 may be disposed on the back side of the rotatable part 122 at different positions along its span L. In yet another alternative, the first and second positions may be disposed on a side edge of the rotatable part at different positions along its span L. The side edge may be a leading or trailing edge.

In the embodiment illustrated in FIG. 2, the redirector 134 may be a mirror that is pivotable about an axis of rotation. The turning tool 138 may be a servo motor, or the like, that is operatively connected to the redirector (mirror) 134 and is configured to move the redirector (mirror) 134 from a first position 135 to a plurality of other positions (second position 137, third position, fourth position etc.).

In operation, when the laser assembly 102 emits a laser beam, the laser beam travels through the emission optic channel 108 to the probe assembly 104. Once in the probe assembly 104, the laser beam travels through the first lens 136. The first lens 136, in this embodiment, focuses the laser beam onto the redirector (mirror) 134. The redirector (mirror) 134 reflects the focused laser beam in a first direction and in doing so changes the general travel direction of the emitted laser beam. This reflected laser beam 124 then travels out the window 140 of the probe assembly 104 and onto the first target 126 on the rotatable part 122 (which in this embodiment is a blade). The reflected incident light 130 travels back from the first target through the window 140 onto the redirector (mirror) 134. The reflected incident light 130 is then reflected off of the redirector (mirror) 134 and travels through the first lens 136 before exiting the probe assembly 104 through the return optic channel 110 and arriving at the detector 106.

When the redirector (mirror) 134 is pivoted or moved, the inbound laser beam emitted from the laser assembly 102 will reflect off of the redirector 134 in a second direction that is different from the first direction. The reflected laser beam 124 then travels in the second direction out the window 140 of the probe assembly 104 and onto the second target 128 on the rotatable part 122 (blade). The second target 128 is different from the first target 126 on the blade 122.

This change in travel path from the first direction to the second direction will also be seen in the (return) travel path of the reflected incident light 130. In some embodiments, a second lens (not shown) may be used instead of the first lens 136 on the travel path of the reflected incident light 130.

Each target 126, 128 on the blade 122 is disposed within a target range 139. The target range 139 may vary. In one embodiment, the length of the target range 139 may extend a distance that is about twenty-five percent of the total length of the blade 122. In another embodiment, each target 128, 130 may be disposed within a target range 139 that extends a distance that is equivalent to about ten percent of the length of the blade 122. In yet another embodiment, each target 126, 128 may be disposed within a target range 139 that has a length of about thirty-five percent of the span of the blade 122. The disclosure is not limited to these exemplary target ranges 139 along the span length. Other target ranges 139 are contemplated as well.

Figure 3:
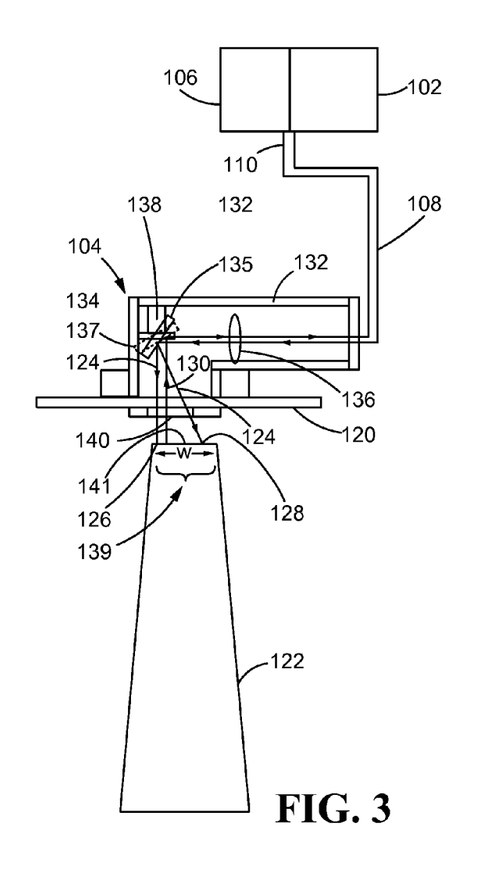
FIG. 3 is a schematic illustration of another embodiment of a probe assembly mounted on a wall of an engine.

Similar to FIG. 2, FIG. 3 illustrates yet another embodiment of the probe assembly 104 of system 100 and an exemplary blade 122. In this embodiment, the probe assembly 104 is configured to move the reflected laser beam 124 from a first target 135 to a second target 137 on the chord of the rotatable part 122. The term "chord" referring to the width W of the tip 141 of the blade 122. Similar to the embodiment, illustrated in FIG. 2, the probe assembly includes a casing 132, a moveable redirector 134, a first lens 136 and a turning tool 138. In this embodiment, the redirector 134 is a mirror that is pivotable about an axis of rotation. The turning tool 138 may be a servo motor, or the like, operably connected to the redirector (mirror) 134 and configured to move the redirector (mirror) 134 from a first position 135 to a second position 137 or any of a plurality of other positions different from the first position 135. The functionality of the embodiment illustrated in FIG. 3 is the same as that discussed for the embodiment in FIG. 2, except that the first and second targets 126, 128 on the blade 122 (and any other subsequent targets) are disposed along the chord W of the blade 122 instead of the span L of the blade 122.

In one embodiment, each target 126, 128 on the blade 122 may be disposed within a target range 139 that may extend a distance that is about twenty-five percent of the chord (width) of the blade 122. (The chord or width W of the blade may also commonly be referred to as the axial length.) In another embodiment, each target 126, 128 may be disposed within a target range 139 that may extend a distance that is about ten percent of the chord (width) of the blade 122. In yet another embodiment, each target 126, 128 may be disposed within a target range 139 that may extend a distance that is equivalent to about thirty-five percent of the chord (width) of the blade 122. The disclosure is not limited to these exemplary target ranges along the chord. Other target ranges are contemplated as well.

Figure 4:
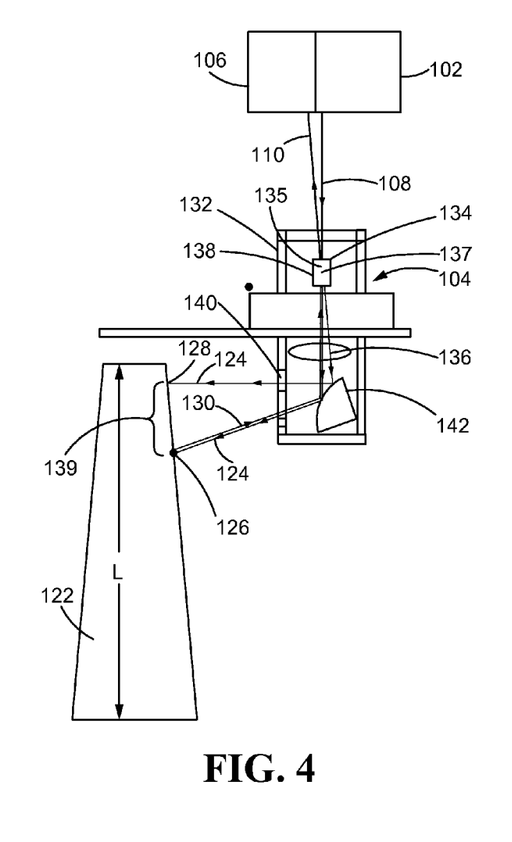
FIG. 4 is a schematic illustration of another embodiment of a probe assembly mounted on a wall of an engine.

Similar to FIGS. 2-3, FIG. 4 illustrates yet another embodiment of the probe assembly 104 of system 100. In this embodiment, the probe assembly 104 is configured to move the reflected laser beam 124 from the first target 126 to a second target 128 on the span L of the rotatable part 122 (in this example, a blade). The probe assembly 104 includes a casing 132, a redirector 134, a first lens 136, a turning tool 138 and a fixed mirror 142. In this embodiment, the moveable redirector 134 may be a portion of the emission optic channel that is disposed inside the probe assembly and is connected to the turning tool 138. The turning tool 138 may be for example, servo motor, or the like, that is operatively connected to the redirector 134 and is configured to move the redirector 134 from a first position 135 to a second position 137 or a plurality of other positions. The fixed mirror 142 may be a convex or multi-faceted mirror, or, in some embodiments, may be multiple fixed mirrors.

In operation, when the laser assembly 102 emits a laser beam, the laser beam travels through the emission optic channel 108 to the probe assembly 104. Once in the probe assembly 104, the laser beam travels through the first lens 136. The first lens 136, in this embodiment, focuses the laser beam onto the fixed mirror 142. The fixed mirror 142 reflects the focused laser beam in a first direction and in doing so changes the general travel direction of the emitted laser beam. This reflected laser beam 124 then travels out the window 140 of the probe assembly 104 and onto the first target 126 on the rotatable part 122, which in this embodiment is a blade. The reflected incident light 130 travels back from the first target 126 through the window 140 onto the fixed mirror 142. The reflected incident light 130 is then reflected off of the fixed mirror 142 and travels through the first lens 136. The reflected incident light 130 exits the probe assembly 104 through the return optic channel 110 and arrives at the detector 106.

When the redirector (portion of the emission optic channel) 134 is pivoted or moved, the inbound laser beam emitted from the laser assembly 102 will travel in a second direction, that is different from the first direction, to the first lens 136. The laser beam will travel through the first lens 136 to the fixed mirror 142. In embodiments where the fixed mirror 142 is convex or multifaceted, the reflected laser beam 124 will travel out the window 140 of the probe assembly 104 and onto a second target 128 on the rotatable part 122 (blade) that is different from the first target 126 on the blade. Similar results may be achieved, if the fixed mirror 142 is a plurality of mirrors, each mirror oriented at a different angle to the other minors.

The directional changes in travel path will also be seen in the (return) travel path of the reflected incident light 130. As noted earlier, in some embodiments, a second lens (not shown) may be used instead of the first lens 136 on the travel path of the reflected incident light 130.

In one embodiment of the arrangement seen in FIG. 4, each target 126, 128 on the blade 122 may be disposed within a target range 139 that may extend a distance of about twenty-five percent of the span L of the blade 122. In another embodiment, each target may be disposed within a target range 139 that may extend a length of about ten percent of the span L of the blade 122. In yet another embodiment, each target may be disposed within a target range 139 that may extend a length of about thirty-five percent of the span L of the blade 122. The disclosure is not limited to these exemplary target ranges 139 along the span L. Other target ranges 139 are contemplated as well.

Similar to FIGS. 2-4, FIG. 5 illustrates yet another embodiment of the probe assembly 104 of system 100. In this embodiment, the probe assembly 104 is configured to move the reflected laser beam 124 from a first target 126 to a second target 128 on the chord W of the rotatable part 122 (this example, a blade). The probe assembly 104 may include a casing 132, a redirector 134, a first lens 136, a turning tool 138 and a fixed mirror 142. In this embodiment, the redirector 134 may be a moveable mirror such as a mirror that is pivotable about an axis. The turning tool 138 may be a servo motor, or the like, operably connected to the redirector (moveable mirror) 134 and configured to move the redirector (moveable mirror) 134 from a first position 135 to a second position 137 or a plurality of other positions. The fixed mirror 142 may be oriented within the probe assembly 104 to receive a laser beam from the first lens 136 and reflect the laser beam onto the redirector 134 (and vice versa for the reflected incident light).

Figure 5:
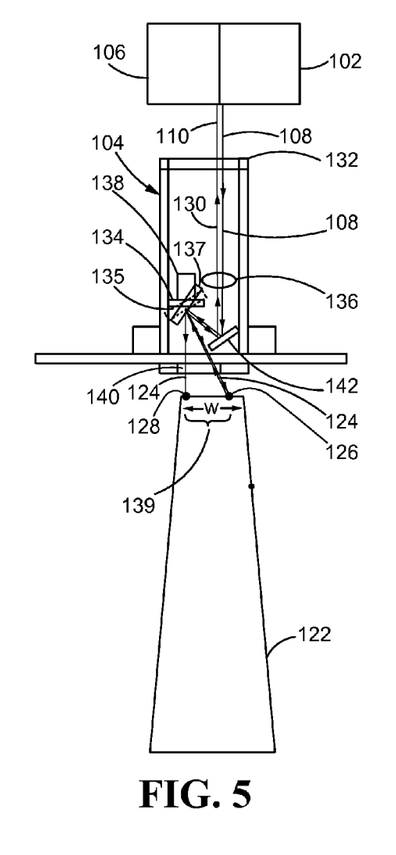
FIG. 5 is a schematic illustration of another embodiment of a probe assembly mounted on a wall of an engine.

In operation, when the laser assembly 102 emits a laser beam, the laser beam travels through the emission optic channel 108 to the probe assembly 104. Once in the probe assembly 104, the laser beam travels through the first lens 136. The first lens 136, in this embodiment, focuses the laser beam onto the fixed mirror 142, which reflects the focused laser beam onto the redirector 134. The redirector 134 then reflects this laser beam and the resulting reflected laser beam 124 then travels out the window 140 of the probe assembly 104 in a first direction and onto the first target 126 on the rotatable part 122, which in this embodiment is a blade. The reflected incident light 130 travels back from the first target 16 through the window 140 onto the redirector (mirror) 134. The reflected incident light 130 is then reflected off of the redirector (mirror) 134 to the fixed mirror 142 and travels through the first lens 136 before exiting the probe assembly 104 through the return optic channel 110 and arriving at the detector 106.

When the redirector (mirror) 134 is pivoted or moved, the laser beam received by the redirector 134 will reflect off of the redirector 134 in a second direction that is different from the first direction. Such reflected laser beam 124 then travels in the second direction out the window 140 of the probe assembly 104 and onto the second target 128 on the rotatable part 122 (blade). The second target 128 is different from the first target on the blade 122.

This change in travel path from the first direction to the second direction will also be seen in the (return) travel path of the reflected incident light 130. In some embodiments, a second lens (not shown) may be used instead of the first lens 136 on the travel path of the reflected incident light 130.

In one embodiment, each target 126, 128 on the blade 122 may be disposed within a target range 139 that may extend a distance of about twenty-five percent of the chord of the blade 122. In another embodiment, each target 126, 128 may be disposed within a target range 139 that extends a distance of about ten percent of the chord of the blade 122. In yet another embodiment, each target 126, 128 may be disposed within a target range 139 that extends a distance of about thirty-five percent of the chord of the blade 122. The disclosure is not limited to these exemplary target ranges 139 along the span. Other target ranges 139 are contemplated as well.

The following describes methods that may be used individually or in combination to perform automated inspection and stress measuring using the system 100. Through the use of these methods maximum local deflections may be obtained.

Figure 6:
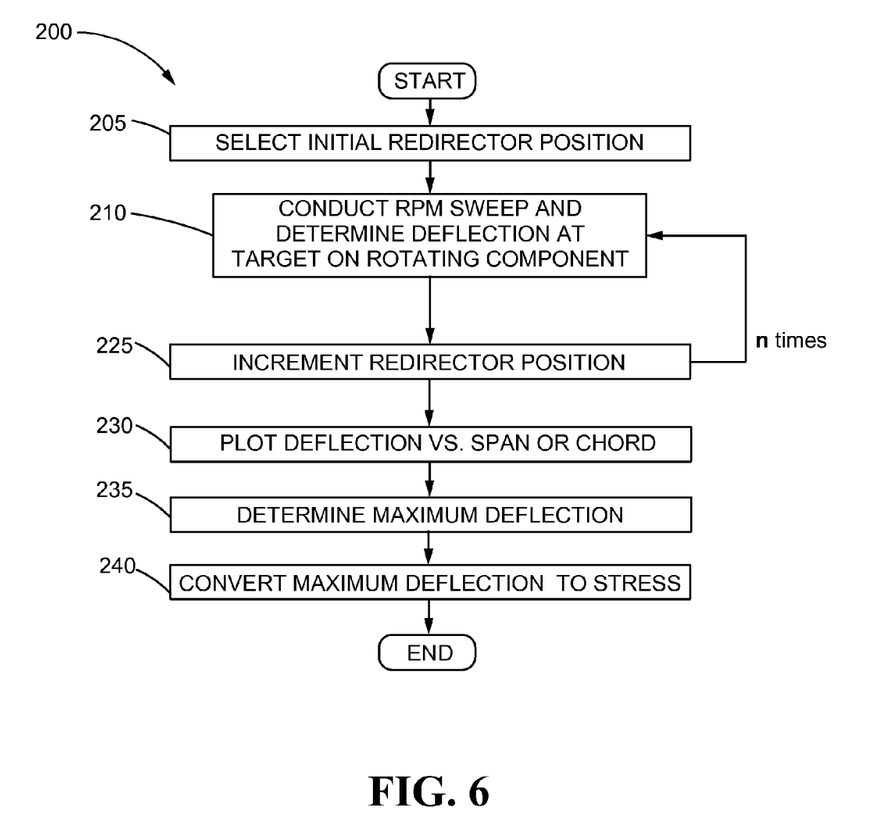
FIG. 6 is a flowchart illustrating a process flow which may be followed in performing inspection and stress measuring using the system of FIG. 1, in accordance with an embodiment.

FIG. 6 is an exemplary flowchart 200 describing a process flow which may be followed in performing automated inspection and stress measuring using the system 100. For exemplary purposes, rotating parts 122 will be blades on an engine 120.

In block 205, the initial position of the redirector 134 is selected. In those embodiments in which the redirector 134 is a moveable mirror, the initial position of the redirector 134 may be selected by selecting the angle at which the mirror 134 will be positioned within the probe assembly 104 that results in a desired target (position) on the blade 122. For example, the angle may be selected in relation to the direction of the laser beam that it will receive, or other appropriate reference point. In embodiments in which the redirector 134 is a portion of the emission optic channel that is disposed inside the probe assembly and is connected to the turning tool 138, the initial orientation of the redirector 134 may be selected by selecting the angle at which the redirector 134 is positioned with respect to the first lens 136, or the fixed mirror 142 or other appropriate reference point.

In block 210, an RPM Sweep is conducted and deflection of the blade is determined at the target (point/position) determined by the redirector position. The engine 120 is accelerated from idle to the maximum revolutions per minute ("rpm") for which the engine is rated and then decelerated to idle (collectively, "RPM Sweep"). Rotation of the blades 122 during the RPM Sweep, causes the blades 122 to experience some level of vibration. This vibrational movement tends to be in the forward and rearward directions in relation to the blade 122 (i.e., normal to the surface) and may be referred to as deflection of the blade 122. There will be a variation from the expected time of arrival of the blade (at the probe assembly 104 location) due to this deflection. The system 100 may be utilized to determine the amount of deflection (at the target 126, 128 point on the blade 122) by using the difference between the expected time of arrival of the target point on the blade and the actual time of arrival of the target point on the blade at a probe assembly 104 location.

To determine the actual time of arrival, the intensity of the reflected incident light 130 off of the rotating blade 122 is measured. In one embodiment, the reflected incident light 130 intensity may be measured (by the detector 106) off of the trailing edge of the rotating blade 122. The reflected incident light 130 increases as the trailing edge of the blade 122 approaches the probe assembly 104 (and the source of the reflected laser beam 124 that is incident on the trailing edge of the blade 122). As the trailing edge leaves the laser beam 124 there is a relatively sharp decrease in the amount of light returned. This relatively sharp drop-off may be utilized to determine the time of arrival.

Once the difference between the expected time of arrival of the blade 122 and the actual time of arrival at a probe assembly 104 position is determined by the controller 112, the amount of measured deflection may be determined by the controller 112 using various methods known in the art. Such methods may include but are not limited to constant velocity, constant acceleration, or spline fit approximations, or the like.

In block 225, the redirector 134 position (angle) is incremented and the method repeats block 210 for the incremented redirector 134 position. Each movement of the redirector 134 changes the position of the target on the blade 122. Blocks 225 and 210 are repeated for each desired redirector 134 position thereby providing the resonant deflection data for each target on the blade 122. In an embodiment, the blocks 225 and 210 are repeated until sufficient data is obtained to quantify the mode shape (normalized deflection versus span or chord) for each blade.

Figure 7:
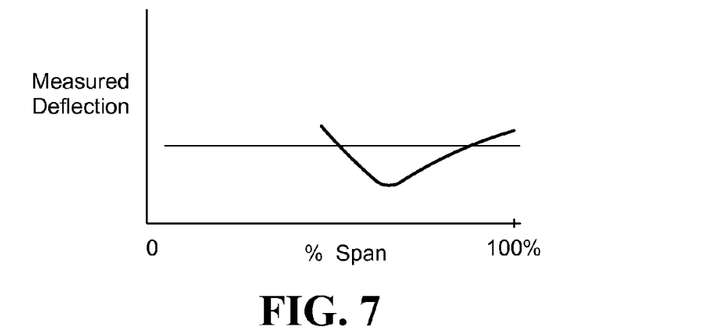
FIG. 7 is a plot of measured deflection in an embodiment.

In block 230, for each blade, the measured deflection is plotted versus the location of the target on the span or the chord of the blade 122 for the resonant speed at which the maximum deflection was experienced during the RPM Sweep. As discussed earlier, the controller 112 determines the amount of measured deflection (at the target point on the blade 122) by using the difference between the expected time of arrival of the target point on the blade 122 and the actual time of arrival of the target point on the blade 122 at a probe assembly 104 position. An exemplary plot of measured deflection may be seen in FIG. 7. In FIG. 7, the deflection is measured for a selected rpm.

In FIG. 7, a measured deflection at 100 percent of the span represents a deflection measured at the top of the blade 122. A deflection measured at the bottom of the blade (near the rotor) would be plotted at the zero percent position on the axis of the chart (although, in FIG. 7 only deflections in the top half of the blade are shown.) In some embodiments, the targets and the associated measurements may be for points that are only in a portion of the total span. For example, in one embodiment, the targets may be disposed in the portion of the span that is between about 50% and about 100% of the span of the blade (the upper half of the blade 122), FIG. 7 is representative of such an embodiment. In some embodiments, the targets may be disposed in a portion of the span that is between about 75% and 100% of the span (the upper quarter of the blade 122). Alternatively, the measured deflection may be plotted versus the location in the chord of the blade 122 in which the target was disposed.

In block 235, the maximum measured deflection of each blade 122 is determined based on the result of block 230.

In block 240, the maximum "measured" deflection may be converted by the controller 212 to measured stress. To convert the maximum measured deflection to measured stress, a ratio of predicted stress to deflection is used. The ratio is based upon a normalized model that predicts stress as a function of deflection in blade contour.

Figure 8:
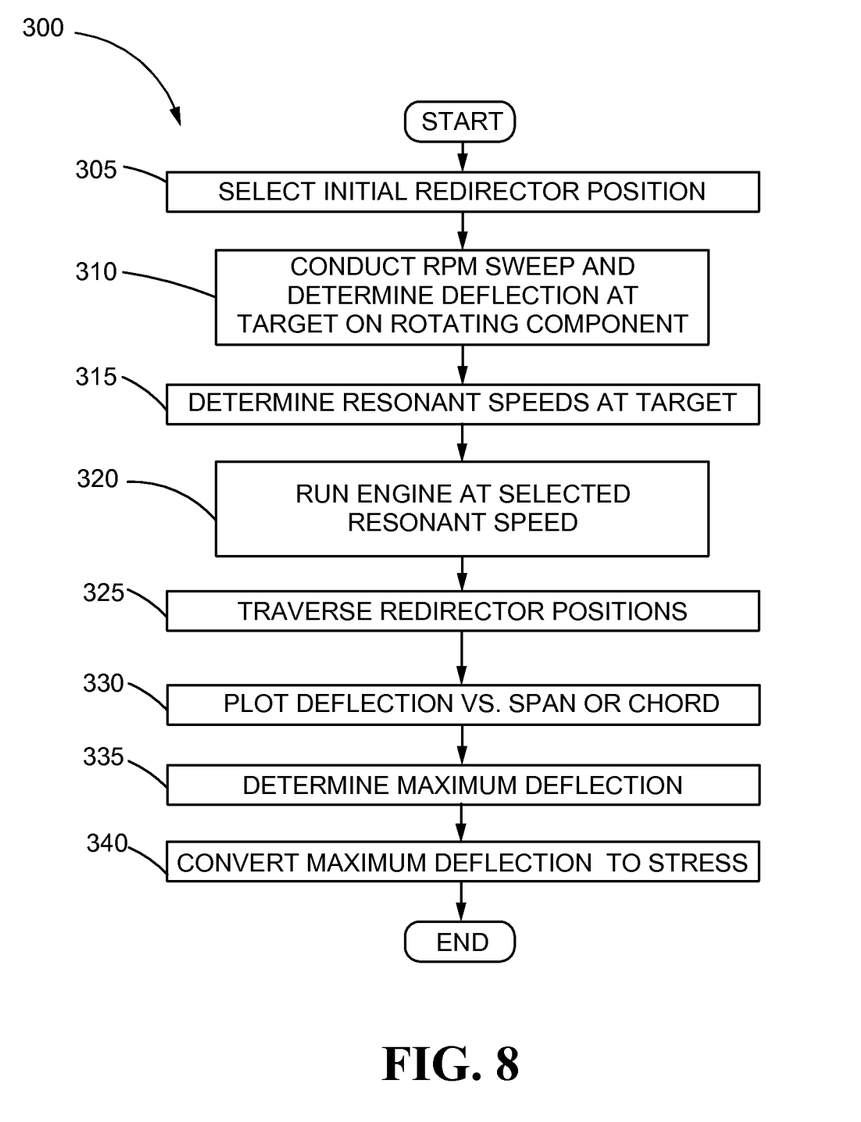
FIG. 8 is another flowchart illustrating a process flow which may be followed in performing inspection and stress measuring using the system of FIG. 1, in accordance with an embodiment.

Alternatively, the process flow 300 illustrated in FIG. 8 may be followed in performing automated inspection and stress measuring using the system 100. For exemplary purposes, rotating parts 122 will be blades on an engine 120.

Similar to block 205 in FIG. 6, in block 305 of FIG. 8, the initial position of the redirector 134 is selected.

In block 310, an RPM Sweep is conducted and deflection of the blade is determined at the target (point/position) determined by the redirector position. As explained previously, rotation of the blades 122 during the RPM Sweep, causes the blades 122 to experience some level of vibration. The system 100 may be utilized to determine the amount of deflection (at the target 126, 128 point on the blade 122) by using the difference between the expected time of arrival of the target point on the blade and the actual time of arrival of the target point on the blade at a probe assembly 104 location.

Once the difference between the expected time of arrival of the blade 122 and the actual time of arrival at a probe assembly 104 position is determined by the controller 112, the amount of measured deflection may be determined by the controller 112 using various methods known in the art. Such methods may include but are not limited to constant velocity, constant acceleration, or spline fit approximations, or the like.

In block 315, the resonant speeds are determined based on the results of the RPM Sweep. In one embodiment, the measured deflection at the target point on the blade 122 is plotted for each rpm speed in the RPM Sweep. A plot may be generated for each blade 122. The rpm speeds at which the plot shows a relative measured deflection maximum are the resonant speeds.

In block 320, the engine 120 is run at a selected resonant speed. In one embodiment, the selected resonant speed may be the speed at which the largest measured maximum deflection was experienced by one of the plurality of blades 122 for the initial target point on the blade 122 within the speed range of the resonance.

In block 325, the redirector 134 is moved to a plurality of selected different positions (angles). Each movement of the redirector 134 changes the position of the target on the blade 122. The amount of measured deflection, at the selected resonant speed, may be calculated for each selected redirector angle (or target point on the blade 122 determined by the redirector angles). As discussed earlier, the controller 112 determines the amount of measured deflection (at the target point on the blade 122) by using the difference between the expected time of arrival of the target point on the blade 122 and the actual time of arrival of the target point on the blade 122 at a probe assembly 104 position.

In block 330, for each blade 122, the measured deflection is plotted versus the position of the target on the span or the chord of the blade 122 for the selected resonant rpm.

In block 335, the maximum measured deflection for each blade is determined based on the result of block 330.

In block 340, the maximum "measured" deflection is converted by the controller 212 to measured stress. To convert the maximum measured deflection to measured stress, a ratio of predicted stress to deflection is used. The ratio is based upon a normalized model that predicts stress as a function of deflection in blade contour.

Alternatively, the above methods may be combined to determine the resonant speed for each target on the blade 122 and to plot the measured deflection for a plurality of resonant speeds.

Figure 9:
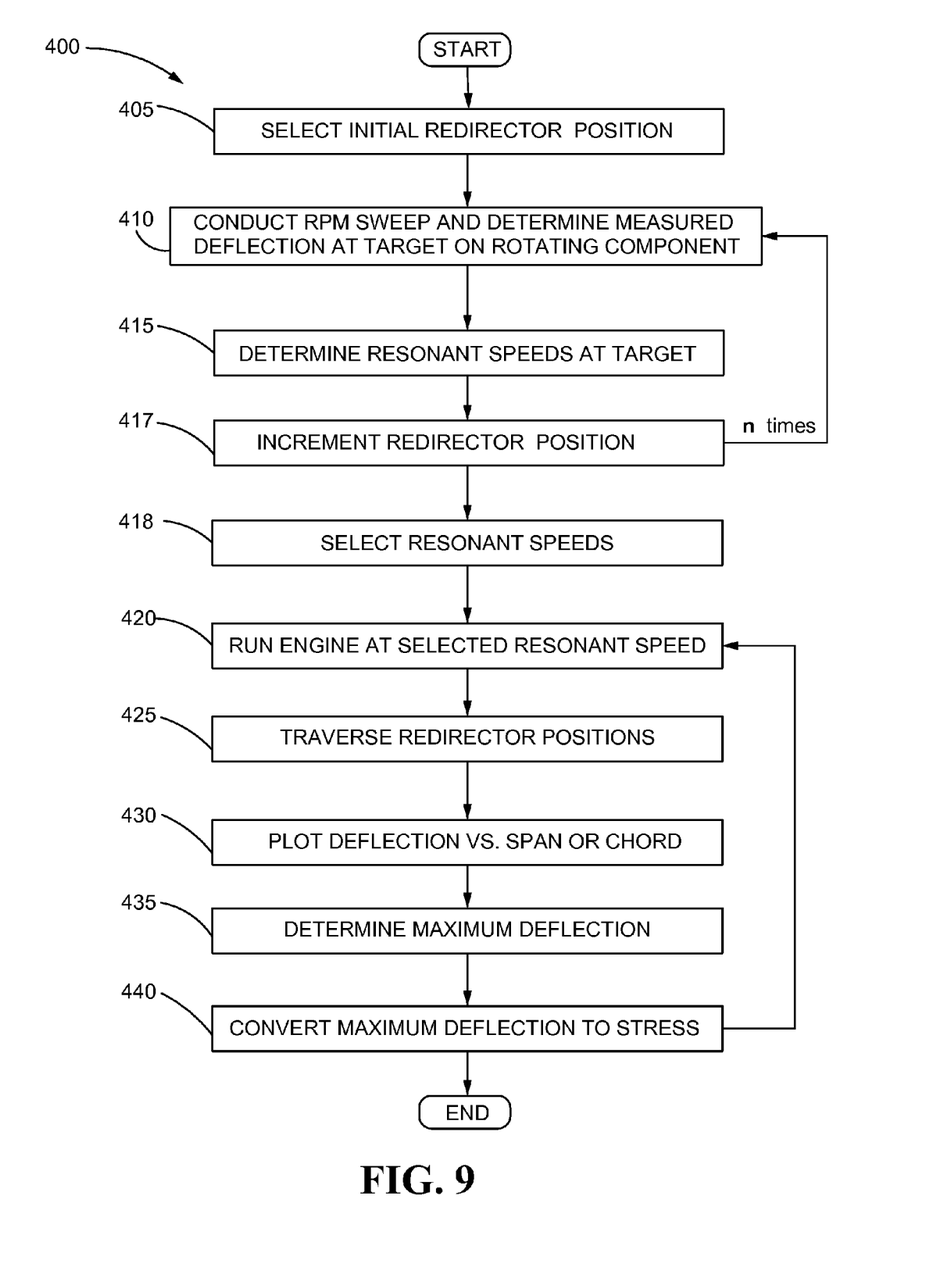
FIG. 9 is another flowchart illustrating a process flow which may be followed in performing inspection and stress measuring using the system of FIG. 1, in accordance with an embodiment.

FIG. 9 is an exemplary flowchart 400 describing a process flow which may be followed in performing automated inspection and stress measuring using the system 100. In block 405, the initial position of the redirector 134 is selected.

Similar to block 210 in FIG. 6, in block 410, an RPM Sweep is conducted and measured deflection of the blade is determined at the target point determined by the initial redirector position.

In block 415 (in FIG. 9), the resonant speeds are determined at the initial target position based on the results of the RPM Sweep. In one embodiment, the measured deflection at the target point on the blade 122 is plotted for each rpm speed in the RPM Sweep. A plot may be generated for each blade 122. The rpm speeds at which the plot shows a relative measured deflection maximum are the resonant speeds.

In block 417, the redirector 134 position is incremented and the method repeats blocks 410-415 for the incremented redirector 134 position. Blocks 417 and 410-415 are repeated for each desired redirector 134 position thereby providing the resonant speeds for each target on the blade 122.

In block 418, one or more resonant speeds are selected for further processing. The selection is made based on the results of the RPM sweeps conducted at the various targets on the blade 122. In one embodiment, the resonant speed(s) selected for further processing may be the rpm(s) at which the greatest maximum deflection was experienced by the maximum responding blade 122 (the blade with the maximum deflection for each mode).

In block 420 (FIG. 9), the engine 120 is run at a selected resonant speed.

In block 425, the redirector 134 is moved to a plurality of different positions (angles). Each movement of the redirector 134 changes the position of the target on the blade 122. The amount of measured deflection, at the selected resonant speed, may be calculated for each selected redirector angle (or target point on the blade 122 determined by the redirector angles). As discussed earlier, the controller 112 may determine the amount of measured deflection (at the target point on the blade 122) by using the difference between the expected time of arrival of the target point on the blade 122 and the actual time of arrival of the target point on the blade 122 at a probe assembly 104 position In block 430, for each blade 122, the measured deflection is plotted versus the location of the target on the span or the chord of the blade 122 for the selected resonant speed. In block 435, the maximum measured deflection for each blade is determined by the controller 112 based on the result of block 430.

In block 440, the maximum "measured" deflection is converted by the controller 112 to measured stress. To convert the maximum measured deflection to measured stress, a ratio of predicted stress to deflection is used. The ratio may be, but is not limited to, a model for rpm that predicts stress as a function of deflection in blade contour.

Blocks 420-440 are then repeated for each selected resonant speed. This results in a plurality of plots for each blade 122 with each plot representative of the measured deflection at a selected (constant) rpm and a measured stress for each of the selected rpms.

INDUSTRIAL APPLICABILITY

In general, the present disclosure sets forth a system and method for performing stress measurement on rotating parts.

The system may include a laser assembly configured to emit a laser beam, and a probe assembly mounted proximal to a rotatable part in an engine. The probe assembly may be configured to output a reflected laser beam onto a first target on the rotatable part. The probe assembly may further be configured to move the reflected laser beam from the first target to a second target on the rotatable part. The probe assembly may include a casing, a redirector moveable from a first position to a second position, and a lens mounted within the casing and configured to focus the laser beam. The redirector may be configured to change the laser beam direction within the casing from a first direction to a second direction when moved from the first position to the second position.

The method may include selecting a first position of a redirector disposed within a probe assembly located proximal to a rotating blade in an engine, performing an rpm sweep, determining maximum deflection for the first position of the redirector, moving the redirector to a plurality of positions other than the first position when the engine is running, determining the maximum deflection of the rotating blade at any of the plurality of positions, and converting the maximum deflection of the rotating blade to a stress measurement for the rotating blade.

The present disclosure provides for the measuring of stress experienced by rotating parts in a way that significantly increases the probability of measuring the local maximum vibratory deflection of a rotating part thereby enabling the measurement of vibratory modes with very small deflection. The ability to measure a multiple locations with a single probe assembly significantly improves the efficiency and confidence of the measured amplitudes as well as insuring correct mode identification and the use of correct stress to deflection ratios (enables validation of predicted mode shape so that analytical models can be updated accordingly).

While only certain embodiments have been set forth, alternatives and modifications will be apparent from the above description to those skilled in the art. These and other alternatives are considered equivalents and within the spirit and scope of this disclosure and the appended claims.

What is claimed is:

1. A traversing time of arrival probe system for stress measurement of rotatable parts, the system comprising:
a laser assembly configured to emit a laser beam; and
a probe assembly disposed proximal to a rotatable part in an engine, the probe assembly configured to output a reflected laser beam onto a first target on the rotatable part, the probe assembly further configured to move the reflected laser beam from the first target to a second target on the rotatable part, the probe assembly including:
a redirector moveable from a first position to a second position, the redirector configured to change the laser beam direction from a first direction to a second direction when moved from the first position to the second position; and
a lens mounted proximal to the redirector and configured to focus the laser beam.

2. The system of claim 1, further comprising:
a detector configured to receive and to measure reflected incident light from the rotatable part, wherein reflection of the reflected laser beam off of the rotatable part is a primary source of the reflected incident light.

3. The system of claim 1, wherein the rotatable part is a blade.

4. The system of claim 3, wherein the first target and second target are disposed in a target range on the span of the blade.

5. The system of claim 4, wherein the length of the target range is less than about 50 percent of the span of the blade and the target range is substantially disposed in the upper half of the blade.

6. The system of claim 3, wherein the first target and the second target are each disposed on the chord of the blade.

7. The system of claim 1, in which the probe assembly further includes a turning tool operably connected to the redirector and configured to move the redirector from the first position to the second position.

8. The system of claim 7, further comprising a controller operably connected to the turning tool, the controller configured to remotely control the turning tool to move the redirector from a first position to a second position, wherein the turning tool is a servo motor.

9. The system of claim 1, wherein the redirector is a moveable mirror.

10. The system of claim 9, wherein the lens is configured to focus the laser beam on the moveable mirror.

11. The system of claim 9, in which the probe assembly further includes a fixed mirror, wherein the lens is configured to focus the laser beam on the fixed mirror and the fixed mirror is oriented to reflect the laser beam onto the moveable mirror.

12. The system of claim 1, in which the probe assembly further includes a fixed mirror, wherein the redirector is a portion of an emission optic channel oriented to emit the laser beam onto the lens, and the lens is configured to focus the laser beam onto the fixed mirror.

13. The system of claim 12, in which the probe assembly further includes a motor operably connected to the emission optic channel and configured to move the emission optic channel from the first position to the second position.

14. The system of claim 12, wherein the fixed mirror is a convex mirror.

15. The system of claim 12, wherein the fixed mirror is a multi-faceted minor.

16. The system of claim 1, in the probe assembly further includes a plurality of fixed minors, wherein the redirector is an emission optic channel oriented to emit the laser beam onto the lens, and the lens is configured to focus the laser beam onto one of the plurality of fixed minors.

17. A method of performing stress measurement on rotating blades, the method comprising:
selecting a first position of a redirector disposed within a probe assembly located proximal to a rotating blade in an engine;
performing an rpm sweep;
determining maximum deflection for the first position of the redirector;
moving the redirector to a first plurality of positions other than the first position while the engine is running;
determining the first maximum deflection of the rotating blade at blade at any of the plurality of positions; and
converting the first maximum deflection of the rotating blade to a stress measurement for the rotating blade.

18. The method of claim 17, in which the moving step further includes repeating the rpm sweep.

19. A traversing time of arrival probe system for stress measurement, the system comprising:
a laser assembly configured to emit a laser beam; and
a probe assembly disposed proximal to a rotating blade in an aircraft engine, the probe assembly configured to output a reflected laser beam onto a first target on the rotating blade, the probe assembly further configured to move the reflected laser beam from the first target to a second target on the rotating blade, the probe assembly including:

a lens configured to receive and focus the laser beam; and a first mirror moveable between a first and second position, the mirror configured to change the laser beam direction from a first direction to a second direction when the mirror is moved from the first position to the second position.

20. The system of claim 19, wherein the lens is configured to focus the laser beam onto the mirror, and the mirror is configured to reflect the laser beam onto the first target on the rotating blade.

* * * * *